(12) United States Patent
Cameron et al.

(10) Patent No.: US 7,905,459 B2  
(45) Date of Patent: Mar. 15, 2011

(54) TRIPOD ATTACHMENT FOR BINOCULARS

(75) Inventors: Richard Cameron, Syosset, NY (US); Manishi Gupta, Los Alamitos, CA (US)

(73) Assignee: Carson Optical, Inc., Hauppauge, NY (US)

( * ) Notice: Subject to any disclaimer, the term of this patent is extended or adjusted under 35 U.S.C. 154(b) by 659 days.

(21) Appl. No.: 11/646,789

(22) Filed: Dec. 28, 2006

(65) Prior Publication Data

US 2008/0156948 A1 Jul. 3, 2008

(51) Int. Cl.
*A47B 1/00* (2006.01)

(52) U.S. Cl. .................. 248/222.11; 248/176.1

(58) Field of Classification Search .......... 248/221.11, 248/225.21, 220.21, 220.22, 227.1, 176.3, 248/176.1; 24/DIG. 52, 303; 70/276; 403/321, 403/322.1, 322.4, 326; 359/404, 407, 409, 359/480, 811

See application file for complete search history.

(56) References Cited

U.S. PATENT DOCUMENTS

| | | | |
|---|---|---|---|
| 4,062,372 A | 12/1977 | Slusher | |
| 4,557,451 A * | 12/1985 | Conway | 248/187.1 |
| 5,317,503 A | 5/1994 | Inoue | 364/400 |
| 5,504,674 A | 4/1996 | Chen et al. | 364/401 |
| 5,809,478 A | 9/1998 | Greco et al. | 705/4 |
| 5,938,155 A * | 8/1999 | Garland | 248/187.1 |
| 5,950,169 A | 9/1999 | Borghesi et al. | 705/4 |
| 6,192,347 B1 | 2/2001 | Graff | 705/36 |
| 6,460,815 B1 * | 10/2002 | Thaler | 248/187.1 |
| 6,540,185 B2 * | 4/2003 | Ishikawa et al. | 248/187.1 |
| 6,669,353 B2 * | 12/2003 | Kung | 362/191 |
| 6,983,253 B1 | 1/2006 | Maul et al. | 705/4 |
| 6,985,873 B2 | 1/2006 | Sullivan | 705/14 |
| 7,024,418 B1 | 4/2006 | Childress | 707/120 |
| 7,344,320 B2 * | 3/2008 | Barker et al. | 396/419 |
| 2002/0003608 A1 * | 1/2002 | Yamada | 351/245 |
| 2003/0058531 A1 * | 3/2003 | Baun et al. | 359/430 |
| 2005/0207749 A1 | 9/2005 | Barker et al. | |

* cited by examiner

*Primary Examiner* — A. Joseph Wujciak, III

(74) *Attorney, Agent, or Firm* — Carmody & Torrance LLP

(57) ABSTRACT

A tripod attachment assembly for attaching to a pair of binoculars, the tripod attachment comprising a support assembly; a coupling assembly releasably coupleable to the support assembly, for coupling the binoculars to the support assembly; and a locking assembly for releasably locking the coupling assembly to the support assembly. In the preferred embodiment, the coupling assembly is magnetically coupleable to the support assembly.

8 Claims, 4 Drawing Sheets

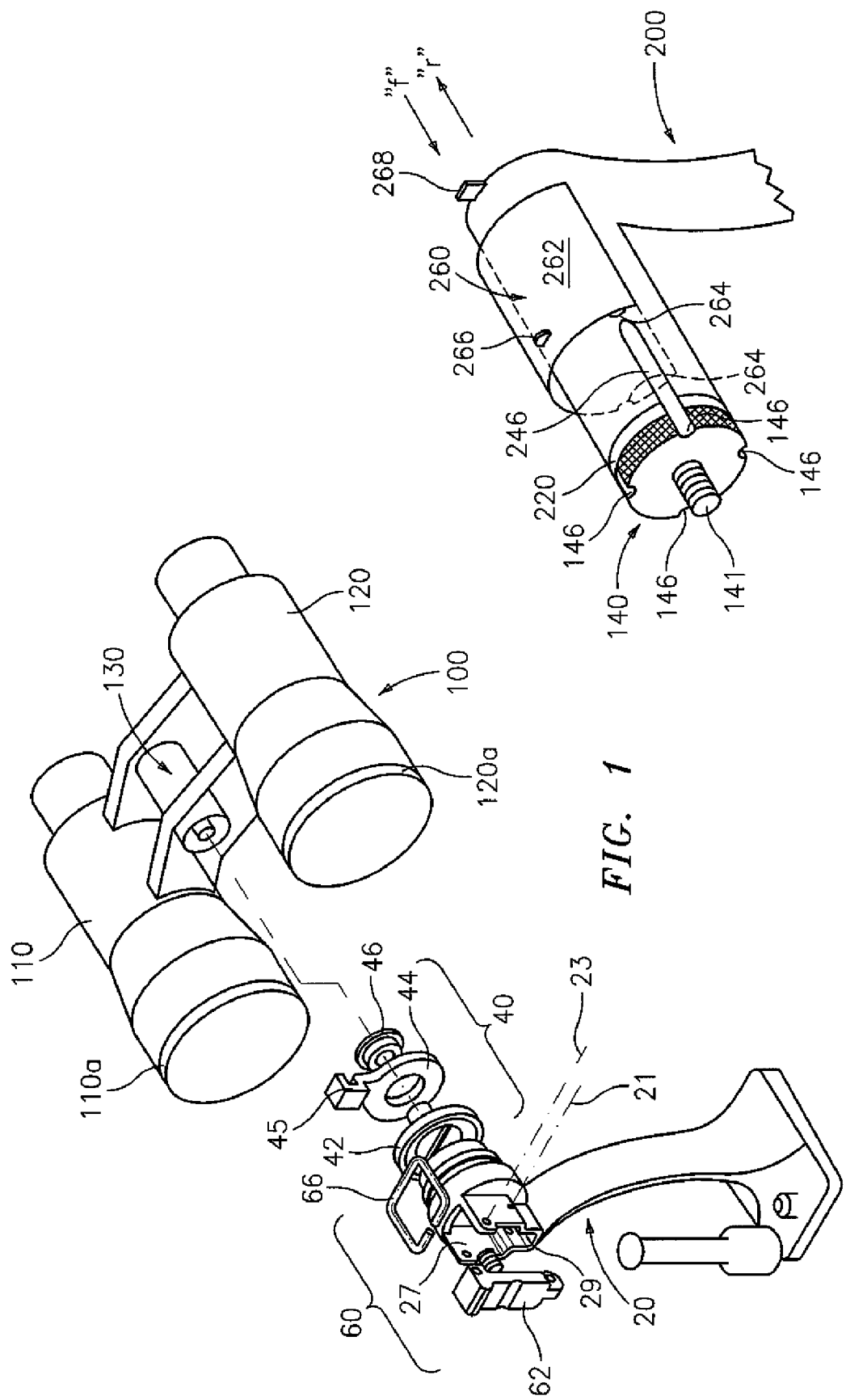

TRIPOD ATTACHMENT FOR BINOCULARS

BACKGROUND OF THE INVENTION

The present invention relates generally to tripod attachments for binoculars, and in particular, to a tripod attachment assembly for attaching to a pair of binoculars that comprises a support assembly, a coupling assembly preferably magnetically coupleable to the support assembly for coupling the binoculars to the support assembly, and a locking assembly for releasably locking the coupling assembly to the support assembly.

Tripod adaptors and attachments for binoculars and other devices are known in the art. One type of conventional tripod adaptor for binoculars includes a fixing screw which can be screwed into a mating receptacle on the tripod to ensure an acceptable coupling of the adaptor to the tripod. The tripod adaptor itself would also be typically threadably coupled to the binoculars. One exemplary embodiment of this type of tripod adaptor is described in U.S. Pat. No. 6,540,185.

However, the foregoing embodiment is less than desirable as it does not provide a sufficiently quick decoupling (e.g. release) of the device (or the adaptor) from the tripod itself.

Attempts to overcome such deficiencies have been attempted. One such example is described in U.S. Pat. No. 6,460,815. In yet another known example, Published Application Serial No. 2005/0207749 describes a magnetic-based mount for releasably attaching a camera, spotting scope, gun or arm rest.

However, it remains preferable to couple binoculars horizontally rather than vertically (e.g. as contrasted between the illustrations of U.S. Pat. No. 6,540,185 (horizontally mounted binoculars) and Published Application Serial No. 2005/0207749 (vertically mounted camera)). Therefore, more consideration to ensuring against an undesirable, inadvertent or premature decoupling of the binoculars from the tripod attachment is needed, all the while considering the need for a quick release therefrom. For example, magnetically coupling binoculars to a tripod adaptor in combination with a locking assembly to be used therewith would be both desirable and advantageous.

Improvements to the art in other areas are also desirable. For example, a tripod adaptor that can accommodate a larger assortment of binoculars, such as those with large objective lenses (e.g. barrels), is also desirable.

Thus, it is believed that further advances in the art are desirable. For example, it would be desirable and advantageous to provide a tripod attachment for binoculars in which the binoculars are preferably magnetically coupleable to the support assembly and wherein there is a provided a quick release locking assembly for releasably locking the binoculars to and from the tripod. It is thus believed that the present invention overcomes the aforementioned deficiencies and achieves the aforementioned and below mentioned objectives.

SUMMARY AND OBJECTIVES OF THE PRESENT INVENTION

It is thus an objective of the present invention to overcome the perceived deficiencies in the prior art.

For example, it is an objective of the present invention to provide an improved tripod attachment for binoculars that ensures against an undesirable, inadvertent or premature decoupling of the binoculars from the tripod.

It is yet another objective of the present invention to provide an improved tripod attachment for binoculars that allows for a quick release locking assembly for releasably locking binoculars to and from the tripod and/or the tripod adaptor.

It is yet another objective of the present invention is to provide a tool that assists in releasing a magnetically coupled coupling assembly from the tripod.

Still another objective of the present invention is to provide a tripod attachment that can accommodate a larger assortment of binoculars, such as such as those with large objective lenses (e.g. barrels).

Yet another objective of the present invention is to provide an improved tripod adaptor for binoculars that is both easy to use and manufacture and also that achieves all of the advantages and objectives set forth herein.

Further objects and advantages of this invention will become more apparent from a consideration of the drawings and ensuing description.

The invention accordingly comprises the features of construction, combination of elements, arrangement of parts and sequence of steps which will be exemplified in the construction, illustration and description hereinafter set forth, and the scope of the invention will be indicated in the claims.

To overcome the perceived deficiencies in the prior art and to achieve the objects and advantages set forth above and below, the present invention is, generally speaking, directed to a tripod attachment assembly for attaching to a pair of binoculars. In a preferred embodiment, the tripod attachment comprises a support assembly; a coupling assembly releasably coupleable to the support assembly, for coupling the binoculars to the support assembly; and a locking assembly for releasably locking the coupling assembly to the support assembly.

A preferred feature of the invention provides that the coupling assembly is magnetically coupleable to the support assembly. Moreover, another preferred feature is that the coupling assembly may comprise a hook, and the locking assembly comprises a latch; wherein when the latch engages the hook when the coupling assembly is coupled to the support assembly, the coupling assembly is inhibited from decoupling from the support assembly. A preferred construction of the coupling assembly comprises a coupler, a ring comprising the hook, and a cap for retaining the ring on the coupler, wherein the ring is rotatable relative to the coupler so that the hook is alignable with the latch for engaging the hook. As yet another feature of the invention, a releasing member for assisting in the disengagement of the coupling assembly from the support assembly is provided.

However, other embodiments are disclosed herein.

Furthermore, while the present invention is designed primarily for use with binoculars, such is only a preferred embodiment, as one skilled in the art would appreciate that other devices, such as cameras to name but one, are usable with the present invention if so constructed for use with a tripod adaptor as disclosed herein.

BRIEF DESCRIPTION OF THE DRAWINGS

The above set forth and other features of the invention are made more apparent in the ensuing Description of the Preferred Embodiments when read in conjunction with the attached Drawings, wherein:

FIG. 1 is an exploded perspective view of a tripod attachment assembly constructed in accordance with the present invention in combination with a conventional pair of binoculars to be used therewith;

FIG. 9 is an exemplary alternative assembly for use with the present invention.

Identical reference numerals in the figures are intended to indicate like parts, although not every feature in every figure may be called out with a reference numeral.

DETAILED DESCRIPTION OF THE PREFERRED EMBODIMENTS

Figure 7:
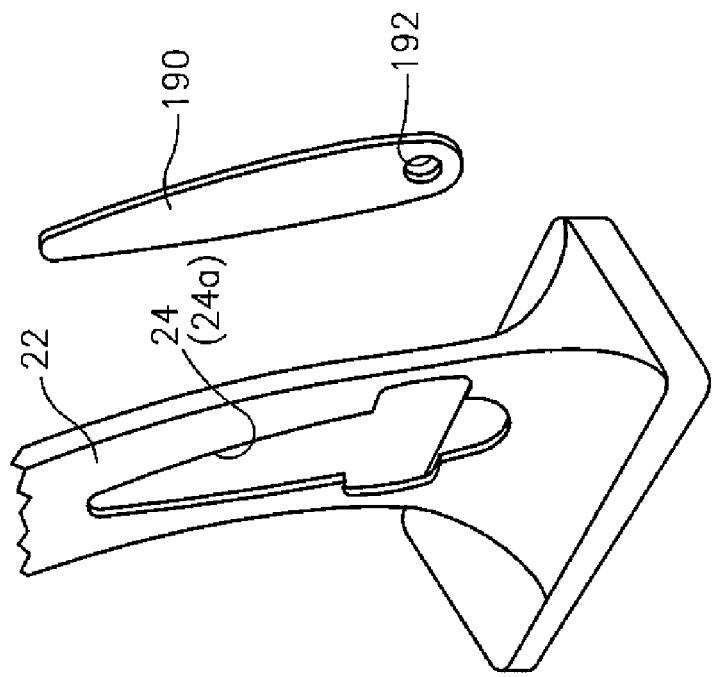
FIG. 7 is a partial view of the support assembly illustrating yet another example of a releasing member usable with the present invention.

Reference is made to FIGS. 1-8, which illustrate a tripod attachment assembly, generally indicated at 10, constructed in accordance with a first embodiment. In this first embodiment, tripod attachment assembly 10 is designed for attachment to, on the one side, a tripod, and on the other side, a pair of binoculars. However, as should be apparent to one skilled in the art, the present invention can be used with other devices, such a camera, just to name but one example. A particularly good exploded view of the present invention, shown in use and combination with a pair of binoculars 100, is illustrated in FIG. 1.

Importantly, it should be understood that the fact that the reference numerals used herein may capture or otherwise point to various and/or more than one element in the figures should not be interpreted in a limiting sense. That is, it is intended that the claims cover the inventive aspects and features of the present invention, but with a recognition that a particular feature or element, although otherwise disclosed or indicated by reference numeral in the figures, need not be read into the claims.

In accordance with the present invention, tripod attachment assembly 10 comprises a support assembly generally indicated at 20, a coupling assembly, generally indicated at 40 (FIGS. 1-8) and 140 (FIG. 9), for coupling the binoculars to support assembly 20, and a locking assembly, generally indicated at 60 (FIGS. 1-8) and 260 (FIG. 9), for releasably locking the coupling assembly to support assembly 20.

Figure 2:
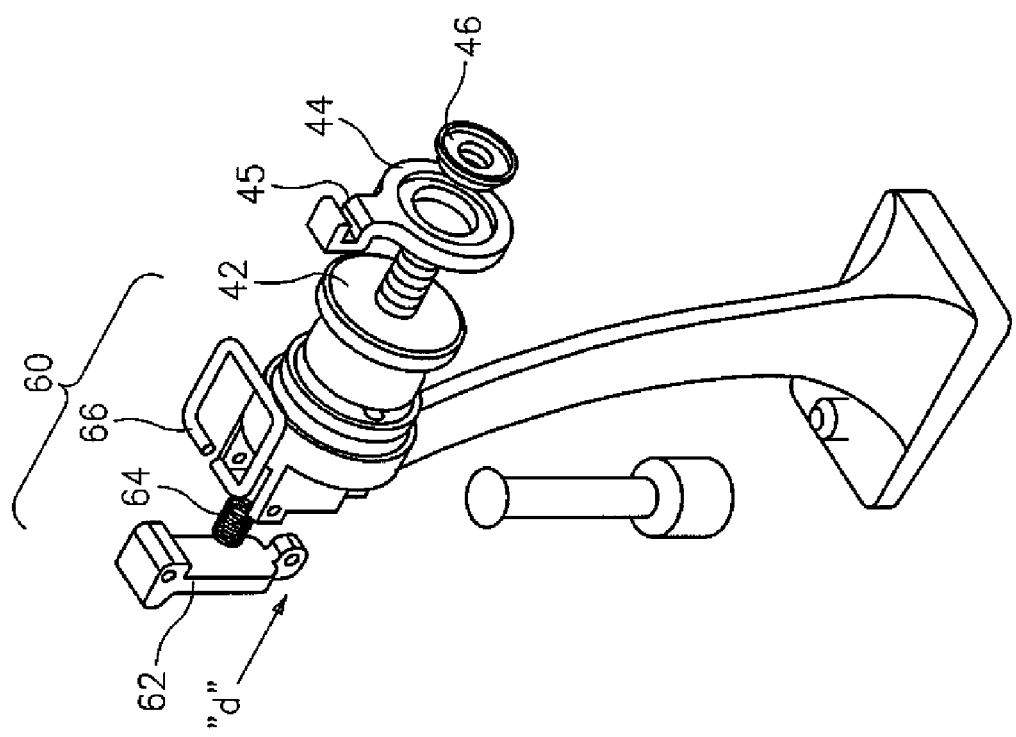
FIG. 2 is another exploded perspective view of the tripod attachment assembly illustrated in FIG. 1 from another angle.
Figure 3:
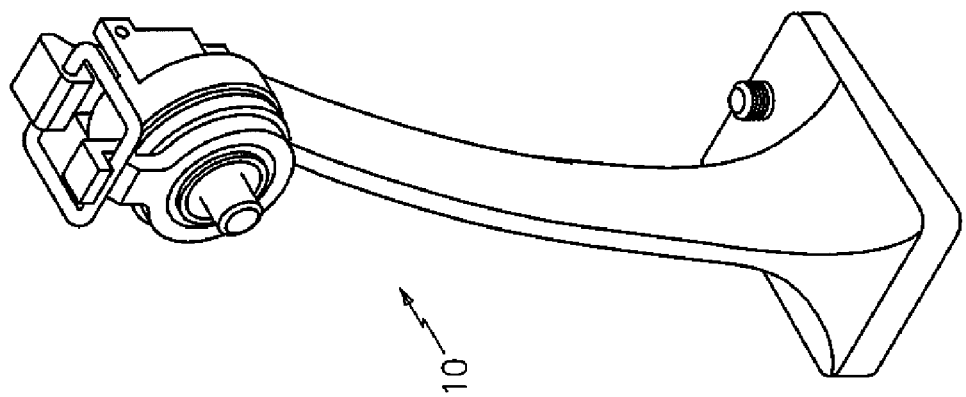
FIG. 3 is yet another perspective view of the tripod attachment assembly of the present invention.
Figure 5:
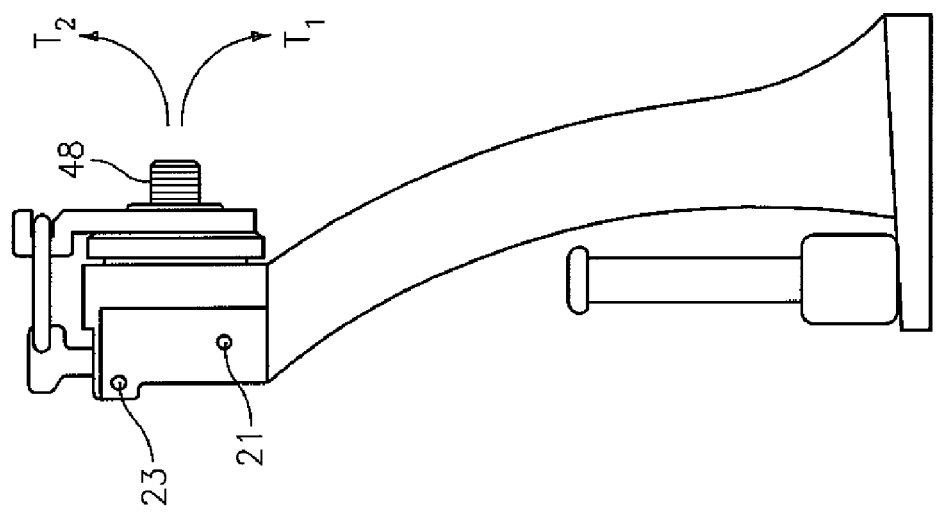
FIG. 5 is another side elevational view of the tripod attachment assembly of the present invention.

In this first embodiment, coupling assembly 40 is releasably coupled to support assembly 20, preferably, through magnetic coupling. To this end, coupling assembly 40 preferably comprises a coupler 42, a ring 44 comprising a hook 45, and a cap 46 for retaining ring 44 on coupler 42. Cap 46 may be threadably coupled to coupler 42 as illustrated in FIG. 2. For reasons that will be disclosed below, ring 44 is preferably rotatable relative to coupler 42 (e.g. when coupling assembly 40 is constructed).

Locking assembly 60 preferably comprises an arm 62, a biasing member, such as a spring 64 and a latch 66 that is connected to one end of arm 62. The other end of arm 62 is preferably pivotally coupled to support assembly 20 about a pin 21 (FIG. 1) which may be inserted as illustrated to retain arm 62 coupled to support assembly 20. FIG. 1 also illustrates another pin 23, which may be provided to maintain the positioning of 62 as well as to prevent arm 62 from over-pivoting, as should be understood from the figures (see FIG. 6). In this construction, arm 62 is spring biased, by spring 64 that at its other end may be pressed against an interior wall of support assembly 20 (see FIG. 6), so that latch 66 acts to resist coupling assembly 40 from disengaging with support assembly 20 when coupling assembly 40 is coupled to support assembly 20.

As should now be understood and as illustrated in the figures, latch 66 can and does engage hook 45 when coupling assembly 40 is coupled (preferably magnetically) to support assembly 20. In this way, coupling assembly 40 is inhibited (i.e. further resisted) from inadvertently or undesirably decoupling from support assembly 20.

A feature and advantage of the present invention is the preferably freely rotatable nature of ring 44 within coupling assembly 40. In this way, hook 45 is easily alignable with latch 66 for engagement therebetween when coupling assembly 40 is coupled to support assembly 20.

To disengage latch 66 from hook 45, slight pressure on arm 62 is made to compress spring 65 sufficiently so that latch 66 moves (e.g. in the direction of arrow "d" (FIGS. 2, 6)) out of engagement with hook 45. Then latch 66 can be rotated (e.g. arrow "r" in FIG. 6) by one's fingers out of position from engagement with hook 45. Complete disengagement of the coupling assembly 40 from support assembly 20 is disclosed further below.

In the preferred embodiment, support assembly 20 includes a magnetic disc 26 that magnetically attracts coupler 42, preferably made of metal. However, it should be understood that coupler 42 could also comprise the magnetic material, thus merely providing that disc 26 be made of metal.

Disc 26 may be coupled to support assembly 20 by being glued or otherwise adhered to screw 28, which itself may be screwed into support assembly 20.

With coupling assembly 40 coupled to support assembly 20, arm 62 is spring biased relative to the support assembly such that latch 66 acts to pull hook 45 in the direction of arrow "p" (FIG. 6), thereby resisting coupling assembly 40 from inadvertent or undesirably disengaging from support assembly 20, especially when the weight of the device (e.g. binoculars 100) is added to the end of coupling assembly 40.

It should also now be understood that latch 66 is pivotable such that the latch is disengageable with hook 45 when arm 62 is pivoted in direction "d" and pivotable in a direction opposite the first direction (i.e. direction "p" (FIG. 6)) so as to assist in resisting the disengagement of coupling assembly 40 from support assembly 20 when latch 66 is engaged with hook 45.

It is desirable that the magnetic coupling between disc 26 and coupler 42 be adequately strong to assist in maintaining the support of binoculars 100 when coupling assembly 40 is coupled to support assembly 20, although not overly strong enough such that when latch 66 is disengaged from hook 45 it remains unreasonably difficult to disengage coupler 42 from disc 26 by using binoculars 100 as the cantilever arm (conventional binoculars include a threaded cavity for receipt of a threaded screw, such as the end of coupler 42). The magnetic coupling should be sufficiently strong so that only a slight and reasonable force need be applied to the binoculars relative to support assembly 20 in a direction denoted by arrows $T_1$ or $T_2$ (FIG. 5) to provide for the decoupling between disc 26 and coupler 42.

However, without binoculars 100 coupled to coupling assembly 40, it may be difficult for an averaged strength individual to remove coupling assembly 40 from support assembly 20 should such decoupling be desired.

Therefore, and in accordance with a preferred embodiment, a releasing member 90 is provided for assisting in a disengagement process of coupling assembly 40 from support assembly 20. In the preferred embodiment, an end 48 of coupler 42 mates with an end 92 of releasing member 90. In a specific embodiment, end 48 of coupler 42 is externally threaded, and end 92 of releasing member 90 has an internally threaded cavity so as to provide threadable coupling between end 48 and end 92. In this way, once releasing member 90 is threadably coupled to coupling assembly 40, releasing member 90 can be used as a cantilever arm to more easily decouple disc 26 from coupling assembly 40.

In another feature of this first embodiment, support assembly 20 comprises a tip 28, preferably but not necessarily located at a base 30 of support assembly 20, which also threadably mates with end 92 of releasing member 90. In this way, end 48 of coupler 42 is threaded, tip 28 of support member 20 is similarly threaded, and end 92 of releasing member 92 is correspondingly internally threaded so as to threadably connect to end 48 of coupling assembly 40 and tip 28 of support member 20. Thus, a tripod attachment system that comprises the tripod attachment assembly as set forth above along with the releasing member is also provided.

In yet an alternative embodiment, a support leg 22 of support assembly 20 includes an aperture (e.g. all the way through leg 22) or recess (e.g. only part way through leg 22) into which can be housed a releasing member 190, likewise provided for assisting in a disengagement process of coupling assembly 40 from support assembly 20. In this embodiment, an aperture or recess 192 in the end of releasing member 190 can be placed on end 48 of coupler 42 and then twisted or rotated such that coupling assembly 40 will decouple from support assembly 20.

As can thus be seen, there is a plurality of ways to provide a releasing member and there are a plurality of ways to package ((e.g. on the base 30 (e.g. threaded tip 28)) or in the support itself (e.g. in an aperture 24 or recess 24a)) the releasing member with the tripod assembly. Therefore, it is a general advantage, objective and feature of the present invention to provide a releasing member as part of a tripod attachment system, wherein the releasing member is provided as part of the tripod attachment system when shipped, packaged or otherwise delivered to an end user or customer.

Figure 8:
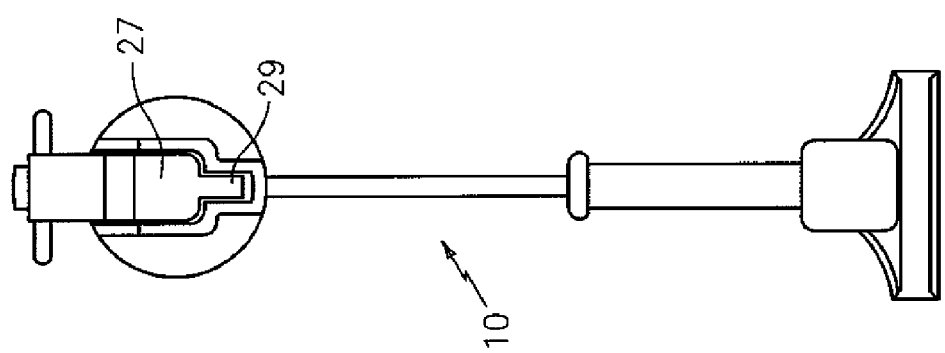
FIG. 8 is a rear elevational view of the tripod attachment assembly of the present invention.
Figure 6:
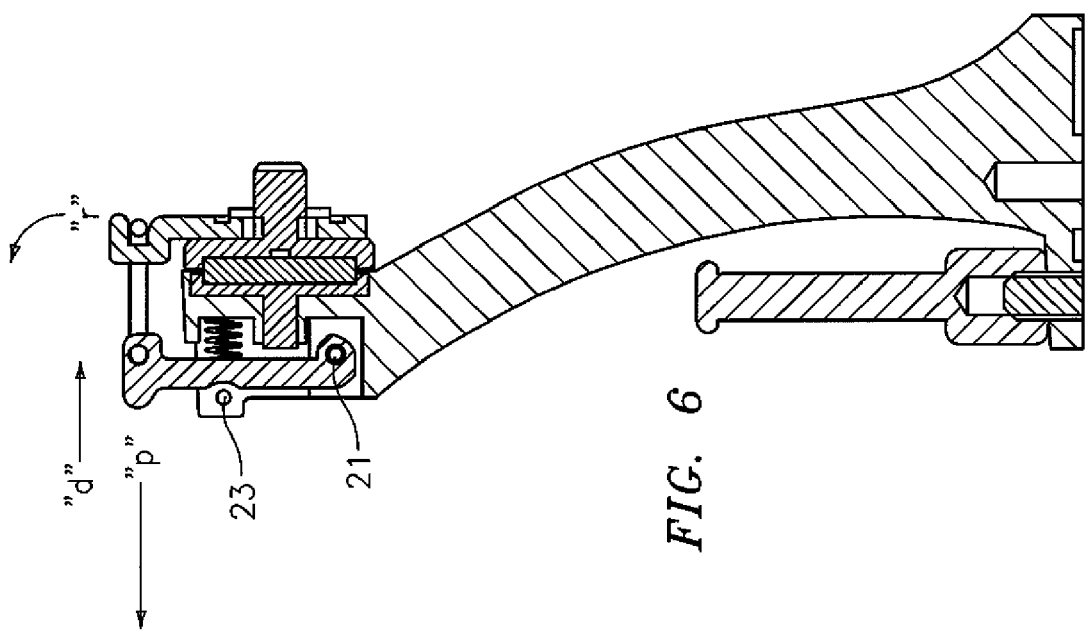
FIG. 6 is a cross-sectional view of the tripod attachment assembly illustrated in FIG. 5.
Figure 4:
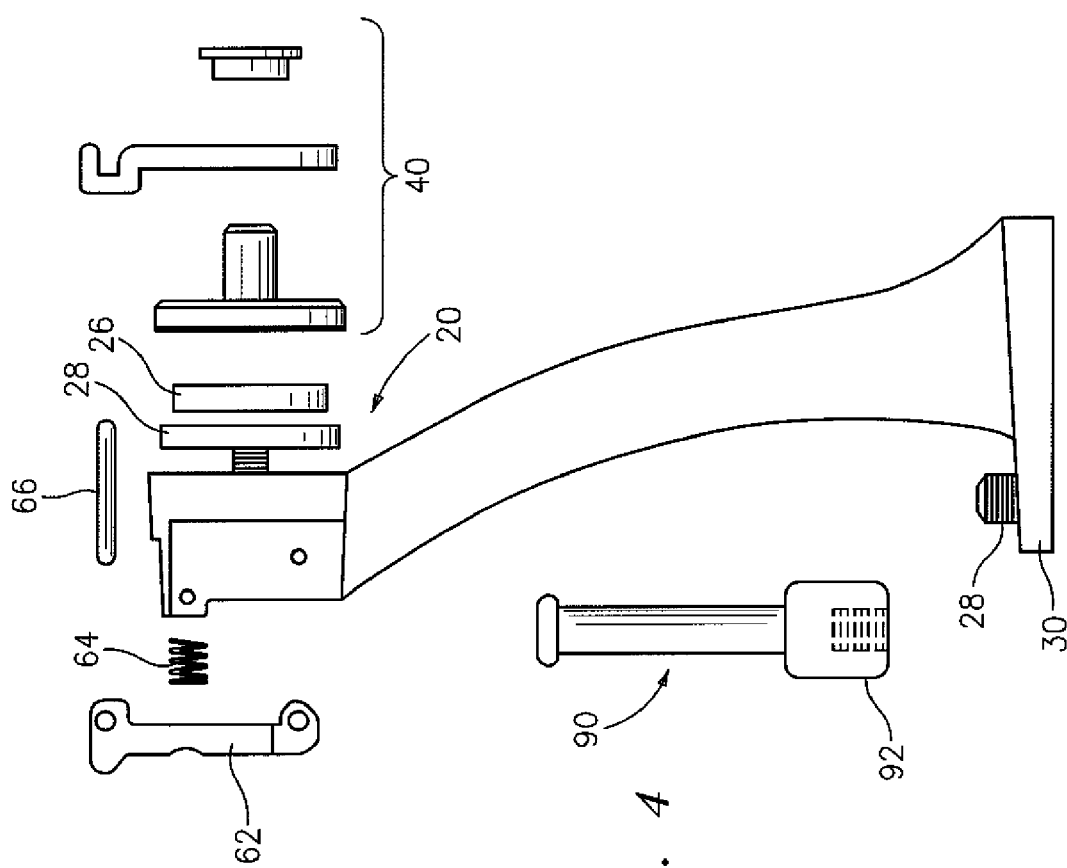
FIG. 4 is an exploded side elevational view of the tripod attachment assembly illustrated in FIG. 1.

Reference is now made to FIGS. 1 and 8, which provides good views of yet another feature of the present invention. Specifically, it can be seen that housing 27 (into which arm 62 may be positioned) of support assembly 20 has a narrowed section 29. It is the appreciation of having narrowed section 29 that permits for a wider assortment of binoculars, such as large binoculars, to be used in combination with the present invention. For example, those skilled in the art would appreciate that binoculars 100 if large enough, may have binocular sections 110, 120 that when rotated about hinge section 130, will come towards each other. Thus, sufficient clearance for tips 110a and 120a of each section are needed, and providing narrowing section 29 achieves this objective by providing the needed clearance in such situations. It is believed that the prior art (e.g. U.S. Pat. No. 6,540,185) is devoid of any such feature or appreciation of the problem addressed and overcome herein.

Reference is now made to FIG. 9, which illustrates an alternative embodiment for the coupling and locking assemblies. For example, FIG. 9 illustrates a coupling assembly 140, which in this embodiment is a magnetic disc, and preferably comprises one or more grooves 146. Assembly 140 is preferably magnetically coupleable to an end 220 of a support assembly 200. The binoculars (or other device, e.g. camera) may be threadably coupled to an end 141 of assembly 140. End 220 also is provided with one or more elongated grooves 246 which are alignable with grooves 146. In this way, a locking assembly 260, comprising a slideable cover 262, can be slid over end 220 and assembly 140 thus locking in place assembly 140 against end 220. When cover 262 is slidably removed from assembly 140 and away from the end of end 220, binoculars 100 (and assembly 140) is free to be decoupled from end 220. Complementary track(s) 264 on one or more sides of cover 262 are dimensioned to correspond and slide within grooves 246 of end 220 and grooves 146 of assembly 140, so as to help ensure the prevention of the rotation of assembly 140. Multiple grooves 146 may be provided on assembly 140 so as to help ensure that there can be alignment of groove(s) 146 and 246 after tip 141 is screwed into the mating receptacle in section 130 of binoculars 100. A tab 266 may be provided to assist in sliding cover 262 in the "f" and "r" directions. A stopper 268 may be provided to ensure cover 262 does not slide off assembly 200.

It should be understood that end 220 of support assembly 200 may comprise the magnetic plate with assembly 140 being made merely of metal, or as disclosed above, assembly 140 may be the magnetic disc that is magnetically attracted to the mere metal end of end 220.

As would be known in the art and to the extent not dictated by function but rather by design, combination of metal and plastic pieces may be used for the components disclosed herein.

It can thus be seen that the present invention is advantageous and overcomes the perceived deficiencies in the prior art. For example, the present invention provides an improved tripod attachment for binoculars that ensures against an undesirable, inadvertent or premature decoupling of the binoculars from the tripod. Additionally, the present invention provides for a quick release locking assembly for releasably locking binoculars to and from the tripod and/or the tripod adaptor. The use of a releaseable magnetic coupling as disclosed herein also provides for a quick release mechanism with the comfort that undesirable or premature release is minimized. The disclosure of a releasing member, such as members 90 and 190, also provides for advantages as set forth herein. Moreover, the present invention provides an improved tripod adaptor for binoculars that is both easy to use and manufacture. The shape of support assemblies 20 and 200 also ensures that a wide range of binoculars shape and sizes can be accommodated.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall there between.

What is claimed is:

1. A tripod attachment assembly for attaching to a pair of binoculars, the tripod attachment comprising:
    a support assembly;
    a coupling assembly releasably coupleable to the support assembly, for coupling the binoculars to the support assembly, wherein the coupling assembly is magnetically coupleable to the support assembly; and
    a locking assembly for releasably locking the coupling assembly to the support assembly;

wherein the coupling assembly comprises a hook, and wherein the locking assembly comprises a latch;
wherein when the latch engages the hook when the coupling assembly is coupled to the support assembly, the coupling assembly is inhibited from decoupling from the support assembly.

2. The tripod attachment assembly as claimed in claim 1, wherein the coupling assembly comprises a coupler, a ring comprising the hook, and a cap for retaining the ring on the coupler, wherein the ring is rotatable relative to the coupler so that the hook is alignable with the latch for engaging the hook.

3. The tripod attachment assembly as claimed in claim 1, wherein the locking assembly comprises an arm to which the latch is coupled, wherein the arm is biased so that the latch acts to resist the coupling assembly from disengaging with the support assembly.

4. The tripod attachment assembly as claimed in claim 3, wherein the arm is spring biased relative to the support assembly such that the latch acts to pull the hook and resist the coupling assembly from disengaging with the support assembly.

5. The tripod attachment assembly as claimed in claim 4, wherein the arm has a first end to which the latch is coupled and a second end that is pivotally coupled to the support assembly,
wherein the latch is pivotable such that the latch is disengageable with the hook when the arm is pivoted in a first direction, and pivotable in a direction opposite the first direction so as to assist in resisting the disengagement of the coupling assembly from the support assembly when the latch is engaged with the hook.

6. A tripod attachment assembly for attaching to a device through which a user can view, the tripod attachment comprising:
a support assembly;
a coupling assembly releasably coupleable to the support assembly, for coupling the device through which a user can view to the support assembly; and
a locking assembly for releasably locking the coupling assembly to the support assembly;
wherein the coupling assembly comprises a hook, and wherein the locking assembly comprises a latch;
wherein when the latch engages the hook when the coupling assembly is coupled to the support assembly, the coupling assembly is inhibited from decoupling from the support assembly; and
wherein the coupling assembly comprises a coupler, a ring comprising the hook, and a cap for retaining the ring on the coupler, wherein the ring is rotatable relative to the coupler so that the hook is alignable with the latch for engaging the hook.

7. The tripod attachment assembly as claimed in claim 6, wherein the coupling assembly is magnetically coupleable to the support assembly.

8. A tripod attachment assembly for attaching to a device through which a user can view, the tripod attachment comprising:
a support assembly;
a coupling assembly releasably coupleable to the support assembly, for coupling the device through which a user can view to the support assembly; and
a locking assembly for releasably locking the coupling assembly to the support assembly;
wherein the coupling assembly comprises a hook, and wherein the locking assembly comprises a latch;
wherein when the latch engages the hook when the coupling assembly is coupled to the support assembly, the coupling assembly is inhibited from decoupling from the support assembly; and
wherein the locking assembly comprises an arm to which the latch is coupled, wherein the arm is biased so that the latch acts to resist the coupling assembly from disengaging with the support assembly, wherein the arm is spring biased relative to the support assembly such that the latch acts to pull the hook and resist the coupling assembly from disengaging with the support assembly, and wherein the arm has a first end to which the latch is coupled and a second end that is pivotally coupled to the support assembly,
wherein the latch is pivotable such that the latch is disengageable with the hook when the arm is pivoted in a first direction, and pivotable in a direction opposite the first direction so as to assist in resisting the disengagement of the coupling assembly from the support assembly when the latch is engaged with the hook.

\* \* \* \* \*